United States Patent [15] 3,643,871
Hamernik et al. [45] Feb. 22, 1972

[54] TORCH APPARATUS

[72] Inventors: Edward L. Hamernik; Frank T. Kawamoto, both of Minneapolis, Minn.

[73] Assignee: Tescom Corporation, Minneapolis, Minn.

[22] Filed: Jan. 30, 1970

[21] Appl. No.: 7,173

[52] U.S. Cl. ...................... 239/419.3, 239/422, 239/424.5
[51] Int. Cl. ............................................. F23d 11/16
[58] Field of Search ...................... 239/419.3, 424.5, 422

[56] References Cited

UNITED STATES PATENTS

| 3,433,418 | 3/1969 | Hach, Jr. | 239/424.5 |
| 1,485,033 | 2/1924 | Jenkins | 239/424.5 |
| 1,808,967 | 6/1931 | Plumley | 239/424.5 |
| 1,926,438 | 9/1933 | Fausek et al. | 239/424.5 |
| 2,881,826 | 4/1959 | Spies, Jr. | 239/424.5 |

Primary Examiner—Lloyd L. King
Attorney—Dugger, Peterson, Johnson & Westman

[57] ABSTRACT

Torch apparatus that includes a torch head having a torch bore, a mixer in the torch bore, a torch tip, a collar on the torch tip and a head nut threaded on the torch head to, through the collar, retain the seating surface of the torch tip against the seating surface of the mixer. A mixer cutting oxygen passageway at each end respectively opens to a corresponding passageway in the torch head and the torch tip. Torch head preheat oxygen and fuel gas passageways open to oxygen-fuel gas passageways in the mixer which in turn opens to an annular groove in the torch tip, the torch tip oxygen-fuel gas passageways opening to the groove. The tip seating surface is recessed from the flanged edge of the collar.

7 Claims, 4 Drawing Figures

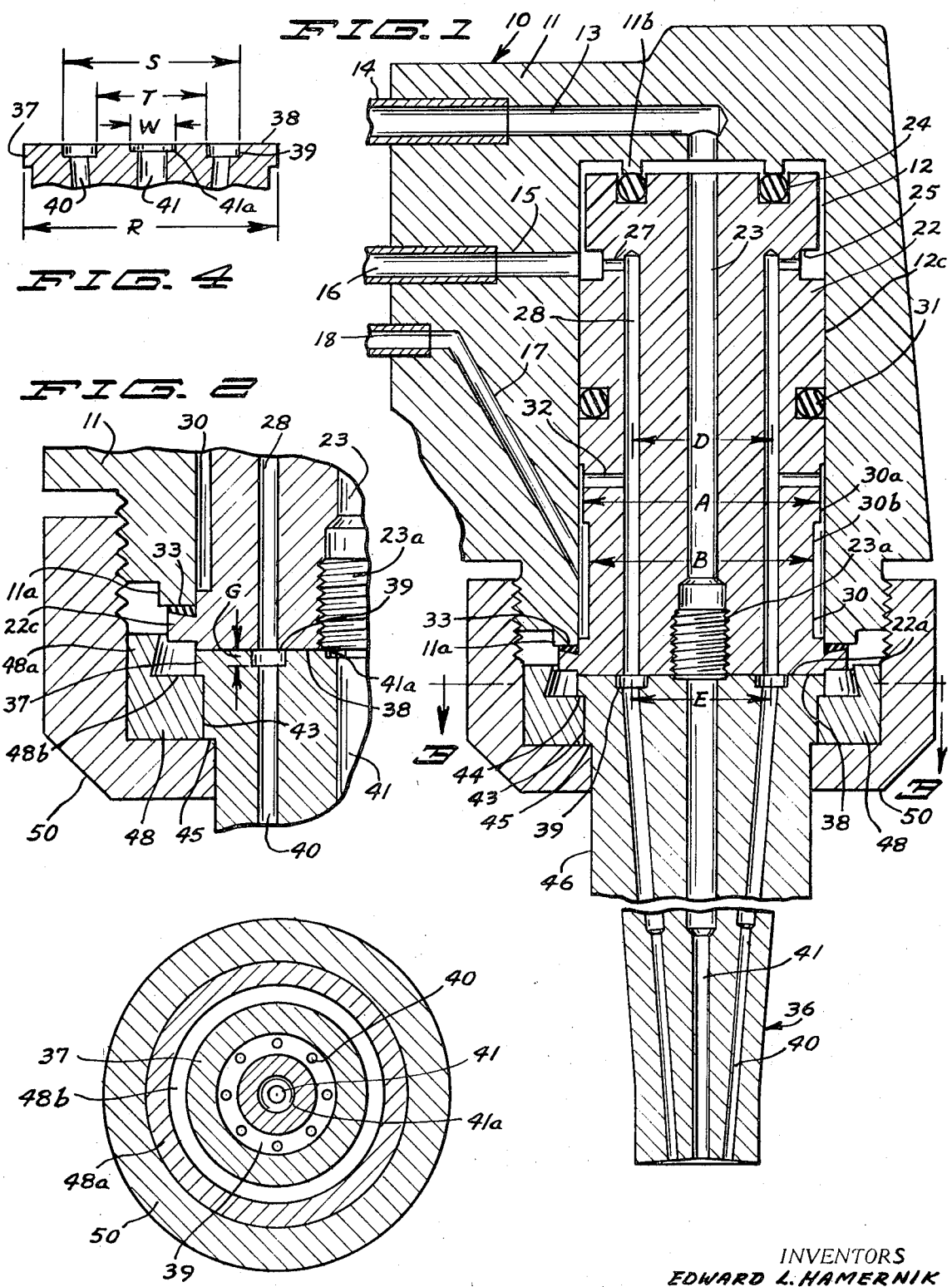
PATENTED FEB 22 1972
3,643,871
INVENTORS
EDWARD L. HAMERNIK
FRANK T. KAWAMOTO
BY
Dugger, Peterson, Johnson & Westman
ATTORNEYS

TORCH APPARATUS

BACKGROUND OF THE INVENTION

Torch apparatus that includes a torch head, a gas mixer and a torch tip mounted on the torch head to abut against the mixer.

In cutting, heating and welding torches, the torch tip usually wears faster than the torch head or mixer, and thus it is desirable to be able to replace the torch tip. However with replaceable torch tips of the prior art, there has been the problem of making a tip that will have the proper capacity, be of simple, inexpensive construction to produce and at the same time form a good sealing fit with the mixer portion of the torch head. In order to overcome problems such as these, as well as others, this invention has been made.

SUMMARY OF THE INVENTION

Torch apparatus that includes a torch head having a gas mixer in the torch head bore, a torch tip mounted on the torch head and having a sealing surface abutting against a corresponding surface of the mixer. Preheat oxygen-fuel gas passageways in the mixer open to an annular groove in the torch tip which also has corresponding passageways opening to said groove.

One of the objects of this invention is to provide new and novel torch apparatus having a torch tip that includes a seating surface portion for seating against a seating surface of a mixer and has an annular groove that opens to the oxygen-fuel gas passageways of the mixer and the torch tip. Another object of this invention is to provide new and novel torch apparatus having a collar crimped on a torch tip with the torch tip having a seating surface seatable against a mixer and recessed relative the collar.

BRIEF DESCRIPTION OF THE DRAWINGS

FIG. 1 is an axial cross-sectional view through the torch head, mixer and torch tip of this invention, said view schematically showing the connection of sources of cutting oxygen, preheat oxygen and fuel gas to the torch head;

FIG. 2 is a fragmentary enlarged cross-sectional view of a portion of the structure of FIG. 1 to more clearly illustrate the mounting of the torch tip relative the mixer and torch head;

FIG. 3 is a transverse cross-sectional view generally taken along the line and in the direction of the arrow 3—3 of FIG. 1 to further illustrate the construction of the torch tip; and FIG. 4 is a fragmentary cross-sectional view of a portion of the tip of FIG. 1 adjacent the mixer.

DESCRIPTION OF THE PREFERRED EMBODIMENT

The torch apparatus of this invention, generally designated 10, includes a torch head 11 having a torch bore 12 opening through one surface thereof, a cutting oxygen passageway 13 having a cutting oxygen conduit 14 seated in one end thereof and opening thereto and an opposite end opening to the central portion of bore 12; a preheat oxygen passageway 15 having a preheat oxygen conduit 16 seated in one end thereof and opening thereto and at the other end opening through the circumferential wall of the torch head bore; and a fuel gas passageway 17 having one end of a fuel gas conduit 18 seated therein and opening thereto and at the other end opening through the circumferential wall of the bore 12 at a substantially greater axial distance from the opening of the cutting oxygen passageway 13 to the bore 12 than the preheat oxygen passageway 15.

Mounted in the torch head bore is a mixer 22 having an axially elongated bore 23 opening at one end to the cutting oxygen passageway 13. An annular groove is provided in the last mentioned and portion of the mixer to seat an O-ring 24 for forming a fluid seal with the annular boss 11b of the torch head at the end of the bore 12 through which bore 13 opens. The mixer is provided with an annular groove 25 in its circumferential wall portion directly opposite the opening of passageway 15 to the torch head bore. A plurality of angular spaced cross bores 27 at their one ends open to groove 25 and at their opposite ends open to the one end of the respective axially elongated oxygen-fuel gas bore 28. Each of the bores 28 extends axially and opens through the generally planar end surface 22a of the mixer.

The mixer is provided with an annular cutout 30 having a maximum diameter portion 30a, and a minimum diameter portion 30b to which the fuel gas passageway 17 opens. Axially intermediate the annular cutout 30 and the groove 25, the mixer is provided with a circumferential groove in which an O-ring 31 is seated to form a fluid seal with the adjacent wall portion of the torch head bore axially intermediate the openings of the preheat oxygen passageway and the fuel gas passageway to the torch head bore. A plurality of angular spaced radial cross bores 32 at their one ends open to cutout portion 30b and at their opposite ends to the respective oxygen-fuel gas bore 28.

The end of the torch head opposite the opening of the cutting oxygen passageway is provided with an annular end flange 11a surrounding bore 12. The mixer has an enlarged annular flange 22c having a radially inwardly tapered (frustoconical) surface adjacent flange 11a that is tapered in the direction toward surface 22a. A gasket 33 is provided between the aforementioned tapered surface and flange 11a to form a fluid seal between the torch head and flange 22c.

The torch tip, generally designated 36, is axially elongated and has an enlarged diametric end portion 37. Portion 37 has a generally planar surface 38 to form a seating fit with surface 22a of the mixer, portion 37 being provided with an annular groove 39 of inside and outside diameters to open to the adjacent ends of the oxygen-fuel gas passageways 28. The torch is also provided with a plurality of angular spaced oxygen-fuel gas passageways 40 that at their one ends open to groove 39 and at their opposite ends to the opposite end of the torch tip. Further, the torch tip is provided with an axially elongated, central cutting oxygen passageway 41 having an enlarged diametric end portion 41a that at the one end opens to bore 23.

The torch tip has an intermediate diametric portion 43 that at its one end forms a shoulder 44 with flange 37 and at its opposite end a shoulder 45 with the main diametric portion 46 of the torch tip.

A collar 48 is crimped onto diametric portion 43 to have a collar annular planar surface 48b in abutting relationship with shoulder 44. The collar is provided with an axially extending annular flange 48a that is of a greater axial dimension than the corresponding dimension of tip portion 37. Flange 48a, portion 37 and surface portion 48b provide an annular groove that is generally axially opposite flange 22c from torch head flange 11a. A head nut 50 has an annular surface abutting against collar 48 and a threaded portion to be threaded onto the torch head to through the collar 48 retain the torch tip surface 38 in tight sealing relationship with premixer surface 22a.

In order to facilitate removal of the mixer from the torch head bore, bore 23 has a threaded end portion 23a into which a screw may be threaded.

The gasket 33 is of a firm material that will not extrude when the head nut is torqued to seal the tip surface 38 to mixer surface 22a, but resilient enough to seal across slight irregularities on the torch head flange 11a. The angle of taper of flange 22c is such to aid in preventing the gasket from extruding when the head nut 50 is torqued to result in the formation of the above mentioned seal, an example of the angle being 10° relative a plane perpendicular to the central axis of elongation of the mixer. With reference to forming the above-mentioned seal, it is to be noted that the flanges 11a and 48a are of diameters such that when the head nut is tightened on the torch head, flanges 11a and 48a will not abut against one another. Accordingly, tightening the nut 50 results in the tip moving axially toward the mixer and the mixer moving axially to compress O-ring 24 and gasket 33.

To be mentioned is that due to surface 38 being recessed relative the annular edge of flange 48a, said surface is protected from damage if the tip is dropped. Additionally by using a collar 48, a smaller diameter stock may be used in making the tip.

By providing the groove 39 in the tip, there is provided a gas distribution channel whereby the oxygen-fuel gas passageways of the mixer do not have to be axially aligned with the oxygen-fuel gas passageways in the tip.

It is believed that it is apparent from the above description that the tip-collar combination 36, 48 may be readily replaced by removing nut 50, positioning another combination with its surface 38 against surface 22a and replacing and torquing nut 50 whereby a seal is formed at gasket 33, O-ring 24 and between surfaces 22a, 38.

In order to have the desired flashback sensitivity and capacity, the mixer diameter A adjacent the fuel gas cross holes should be about 0.600 to 0.620 inch and preferably 0.608 to 0.615 inch, while the diameter B of the gas distribution chamber is in the range of about 0.550 to 0.600 inch. The preferred range of diameters for each of the cross bores 27, 32 is about 0.022 to 0.031 inch. As to each of the oxygen-fuel gas passageways 28, the diameter should be about 0.030 to 0.060 inch and preferably 0.042 to 0.052 inch. The centers of passageways 28 are located on the hole circle of a diameter D ranging from about 0.300 to 0.400 inch. The number of passageways 28 can range from five to nine and can be used with tips having four to eight passageways 40 for acetylene and Mapp Gas and multiple slots (not shown) for L.P. gases. The circle diameter E of the centers of tip passageways 40 ranges from about 0.300 to 0.460 inch.

The axial length G of the groove 39 may range from 0.010 to 0.100 inch, depending on the size of the tip. Further the range of outside diameters R of the flange portion of the tip is about 0.620 to 0.690 inch; the outside diameter S of the groove 39 is about 0.450 to 0.550 inch; the inside diameter T of the groove 39 is about 0.240 to 0.280 inch; and the diameter W of bore portion 41a is about 0.100 inch.

We claim:

1. Torch head apparatus comprising a torch head having a torch head bore, a gas mixer removably mounted on said torch head bore, said mixer having a substantially planar torch tip seating end surface, a cutting oxygen passageway opening through said end surface, and a plurality of preheat oxygen-fuel gas passageways opening through said end surface radially outwardly of the opening of the mixer cutting oxygen passageway through said end surface and spaced angular relative the cutting oxygen passageway opening, said torch head having passageways for conducting cutting oxygen, and preheat oxygen and fuel gas to the respective mixer passageway, an axially elongated tip having a substantially planar end surface portion seatable against said mixer end surface and an opposite end and means mountable on the head and the torch tip for releasably retaining the tip surface portion in fluid sealing relationship with the mixer end surface, said tip surface portion having an annular groove opening to the mixer oxygen-fuel gas passageways, said tip having a plurality of angular spaced oxygen-fuel gas passageways opening to said groove and through the opposite end of the tip, a cutting oxygen bore opening through said surface portion to the mixer cutting oxygen passageway and through said opposite end, and annular surfaces on opposite sides of groove that are in a common plane and are seatable against the mixer planar end surface in fluid sealing relationship relative thereto.

2. The apparatus of claim 1 further characterized in that said groove has an axial length of about 0.010 to 0.100 inch.

3. The apparatus of claim 1 further characterized in that said end surface portion comprises an enlarged diametric first portion having the tip annular surfaces, that said tip has a second diametric portion of a smaller diameter than said first portion and joined to said first portion to form a shoulder, and that said means comprises a collar fixedly secured to the tip and having a main body annular portion seatable against said shoulder and an axially extending flange integrally joined to said body portion and extending axially away from said shoulder a greater distance and in the same direction that said first portion extends axially away from said shoulder to recess said tip annular surfaces relative the flange and means for removably mounting the collar on the torch head.

4. The apparatus of claim 3 further characterized in that the torch head bore has an annular end flange, that the mixer has an enlarged diametric flange adjacent its tip seating surface that has s frustoconical tapered surface adjacent the torch head end flange that tapers radially inwardly and axially toward the mixer tip seating surface and is of a smaller outside diameter than the inside diameter of said flange and that a resilient gasket is provided between the torch head end flange and the tapered surface.

5. The apparatus of claim 1 further characterized in that said groove has an outside diameter in the range of about 0.450 to 0.550 inch and an inside diameter in the range of about 0.240 to 0.280 inch.

6. The apparatus of claim 5 further characterized in that the groove has an axial depth in the range of about 0.010 to 0.100 inch, that there are provided 5 to 9 mixer oxygen-fuel gas passageways each having a diameter in the range of about 0.030 to 0.060 inch, and that the diameter of the mixer adjacent the mixer fuel gas passageways opening to the torch head bore is about 0.600 to 0.620 inch.

7. For torch head apparatus having a torch head, a mixer that has a generally planar first torch tip seating surface, a cutting oxygen passageway opening through the central portion of the first surface and a plurality of preheat oxygen-fuel gas passageways opening through said first surface angularly spaced relative the mixer cutting oxygen passageway and radially spaced therefrom and torch tip mounting means to removably mount a torch tip, an axially elongated torch tip having a central cutting oxygen bore extending axially therethrough, a mixer seating surface end first portion of a given diameter, a reduced diameter second portion integrally joined to the first portion to form an annular shoulder shoulder therewith, and an opposite end portion, and a collar pressure fitted on the second portion in abutting relation to said shoulder and adapted to be removably held on the torch head by the mounting means, said collar having a flange extending axially in the same direction that the first portion extends axially away from said shoulder and radially spaced from said shoulder, and a generally planar surface between the collar flange and the tip, said flange having an annular edge, said first portion having an annular gas distributing groove surrounding the cutting oxygen bore and spaced therefrom and having annular surfaces in a common plane with the groove radially therebetween, said first portion annular surfaces being abuttable against the first seating surface to form a fluid seal therewith, the axial dimension of the first portion being sufficiently less than the corresponding dimension of said flange to recess the tip annular surfaces relative the collar flange annular edge, said tip having a plurality of angular spaced oxygen-fuel gas passageways that at their one ends open to said groove and at their opposite ends open through said opposite end portion.

* * * * *